(12) United States Patent
Kalhan

(10) Patent No.: US 10,070,417 B2
(45) Date of Patent: Sep. 4, 2018

(54) TRANSMISSION OF DEVICE-TO-DEVICE (D2D) CONTROL DATA FROM A FIRST D2D DEVICE TO A SECOND D2D DEVICE IN A CELLULAR COMMUNICATION SYSTEM

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 220 days.

(21) Appl. No.: 14/400,385

(22) PCT Filed: May 23, 2013

(86) PCT No.: PCT/US2013/042505
§ 371 (c)(1),
(2) Date: Nov. 11, 2014

(87) PCT Pub. No.: WO2013/177449
PCT Pub. Date: Nov. 28, 2013

(65) Prior Publication Data
US 2015/0156757 A1 Jun. 4, 2015

Related U.S. Application Data

(60) Provisional application No. 61/650,865, filed on May 23, 2012.

(51) Int. Cl.
*H04W 72/04* (2009.01)
*H04L 1/16* (2006.01)
(Continued)

(52) U.S. Cl.
CPC ...... *H04W 72/0406* (2013.01); *H04B 7/0413* (2013.01); *H04L 1/1607* (2013.01);
(Continued)

(58) Field of Classification Search
CPC ............ H04W 72/0406; H04W 72/06; H04W 72/023; H04W 72/085; H04W 4/005;
(Continued)

(56) References Cited

U.S. PATENT DOCUMENTS 8,169,957 B2 5/2012 Damnjanovic
8,170,081 B2 5/2012 Forenza et al.
(Continued)

FOREIGN PATENT DOCUMENTS

EP 1 998 499 12/2008
WO 2010013961 A2 2/2010
(Continued)

OTHER PUBLICATIONS

"Macrocell", Wikipedia via Archive.org, archived Jun. 22, 2010.*
(Continued)

*Primary Examiner* — Asad Nawaz
*Assistant Examiner* — Thomas R Cairns

(57) ABSTRACT

A first wireless communication device receives device-to-device D2D control information from a base station in a cellular communication system and sends second device D2D control data to a second wireless communication device. The second device control data may comprise resources information and is used for establishing a D2D communication over a link between the first wireless communication device and the second wireless communication device; the second device D2D control data is at least partially based on the D2D control information.

2 Claims, 4 Drawing Sheets

(51) Int. Cl.
  *H04L 5/00* (2006.01)
  *H04W 72/06* (2009.01)
  *H04B 7/0413* (2017.01)
  *H04W 4/70* (2018.01)
  *H04W 76/14* (2018.01)
  *H04W 72/08* (2009.01)

(52) U.S. Cl.
  CPC ............ *H04L 5/0055* (2013.01); *H04W 4/70* (2018.02); *H04W 72/06* (2013.01); *H04W 76/14* (2018.02); *H04W 72/085* (2013.01)

(58) Field of Classification Search
  CPC . H04W 76/023; H04W 72/042; H04W 72/04; H04W 4/70; H04W 76/14; H04B 7/0413; H04B 2201/70701; H04L 1/1607; H04L 5/0055
  USPC .................................. 370/329, 252
  See application file for complete search history.

(56) References Cited

U.S. PATENT DOCUMENTS

| | | | | |
|---|---|---|---|---|
| 8,493,887 | B2* | 7/2013 | Palanki | H04W 76/023 370/254 |
| 8,504,052 | B2* | 8/2013 | Hakola | H04W 24/10 455/452.1 |
| 8,942,192 | B2* | 1/2015 | Damnjanovic | H04W 72/04 370/329 |
| 9,084,241 | B2* | 7/2015 | Madan | H04W 72/0406 |
| 9,143,275 | B2 | 9/2015 | Li et al. | |
| 2009/0022098 | A1 | 1/2009 | Novak et al. | |
| 2009/0042558 | A1 | 2/2009 | Shen et al. | |
| 2009/0110038 | A1* | 4/2009 | Montojo | H04L 1/003 375/211 |
| 2010/0165882 | A1 | 7/2010 | Palanki et al. | |
| 2012/0093098 | A1* | 4/2012 | Charbit | H04W 72/04 370/329 |
| 2012/0106517 | A1* | 5/2012 | Charbit | H04W 72/04 370/336 |
| 2012/0258706 | A1* | 10/2012 | Yu | H04W 56/0045 455/426.1 |
| 2014/0056213 | A1 | 2/2014 | Goto et al. | |
| 2014/0057670 | A1* | 2/2014 | Lim | H04W 8/005 455/509 |
| 2014/0094183 | A1* | 4/2014 | Gao | H04W 72/048 455/450 |

FOREIGN PATENT DOCUMENTS

| | | | |
|---|---|---|---|
| WO | WO2010082114 A1 * | 7/2010 | |
| WO | WO 2010082114 A1 * | 7/2010 | ............ H04W 72/02 |
| WO | WO 2011-109941 | 9/2011 | |
| WO | WO 2011-132908 | 10/2011 | |
| WO | 2011156638 A2 | 12/2011 | |

OTHER PUBLICATIONS

Texas Instruments; "Comparison of Different ACK/NAK in CQI RS Transmission Schemes"; 3GPP Draft: R1-080189; Jan. 9, 2008; 3GPP Mobile Competence Centre, France.

TD Tech; "Some Considerations on Bundled and Multiplexing ACK Transmission in TDD"; 3GPP Draft: R1-081940; May 2008; 3GPP Mobile Competence Centre, France.

\* cited by examiner

TRANSMISSION OF DEVICE-TO-DEVICE (D2D) CONTROL DATA FROM A FIRST D2D DEVICE TO A SECOND D2D DEVICE IN A CELLULAR COMMUNICATION SYSTEM

RELATED APPLICATIONS

The present application is related to PCT Application No. PCT/US2013/042503, entitled "MANAGEMENT OF DEVICE-TO-DEVICE COMMUNICATION RESOURCES USING CHANNEL SYMMETRY," and PCT Application No. PCT/2013/042511, entitled "ACKNOWLEDGMENT MESSAGING OVER REFERENCE SIGNALS," both filed concurrently on May 23, 2013 with this application, assigned to the assignee hereof and hereby expressly incorporated by reference in its entirety.

FIELD

This invention generally relates to wireless communications and more particularly to management of device-to-device (D2D) communication resources by transmitting D2D control data from a first wireless communication device to a second wireless communication device in a cellular communication system.

BACKGROUND

Many wireless communication systems use base stations to provide geographical service areas where wireless communication user equipment (UE) devices communicate with the base station providing the particular geographical service area in which the wireless communication UE devices are located. The base stations are connected within a network allowing communication links to be made between the wireless communication devices and other devices. In some circumstances, the communication links are between wireless communication UE devices that are close to each other. In these situations, it may be preferred to have a direct communication link between the two wireless UE devices rather than communicating through a base station. Such direct communication between devices is often referred to as device-to-device (D2D) communication or peer-to-peer (P2P) communication.

SUMMARY

A first wireless communication device receives device-to-device (D2D) control information from a base station in a cellular communication system and sends second device D2D control data to a second wireless communication device. The second device control data is used for D2D communication over a D2D communication link between the first wireless communication device and the second wireless communication device. The second device D2D control data is at least partially based on the D2D control information.

DETAILED DESCRIPTION

Figure 1A:
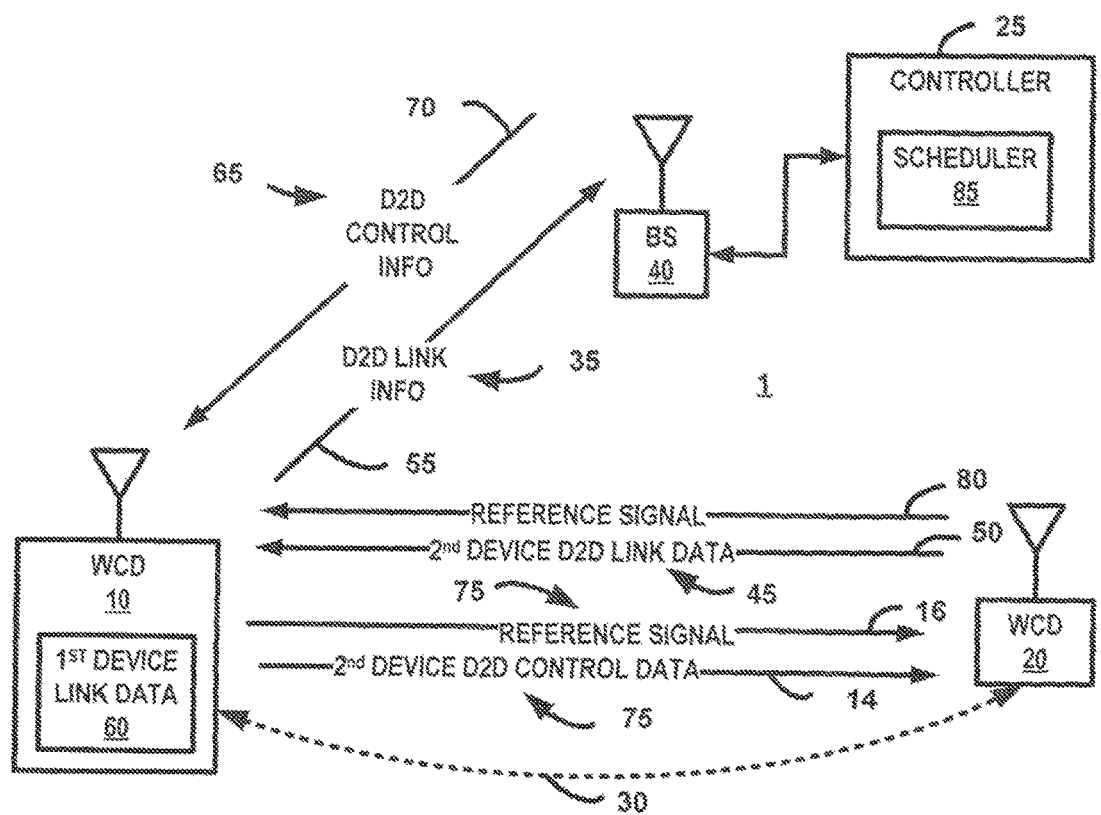
FIG. 1A is a block diagram of an example of a macrocell communication system that supports device to device (D2D) communication where a first wireless communication device sends D2D control signals to a second wireless communication device for D2D link management.

In a cellular system that supports D2D communication, communication resources are allocated for D2D communication between D2D devices. The use of communication resources for D2D management is reduced by providing D2D control information to less than all of the D2D devices engaged in a D2D communication session. For one example, a D2D device receives D2D control data from another device instead of directly from a base station. A controller connected to the base station provides D2D control information to a first D2D device and the first device sends D2D control data to a second D2D device, where the D2D control data is at least partially based on the D2D control information. In some implementations, the controller allocates D2D control information that generally identifies communication resources to be used for D2D communication and the first D2D device schedules (allocates) D2D communication resources, from the system identified resources, for transmission from one or both of the D2D devices and informs the second D2D device of the allocation. In more tightly system controlled implementations, the controller more specifically identifies, to the first D2D device, the D2D communication resources to be used by each D2D device and the first D2D device relays the information to the second D2D information. The D2D control data provided to the second D2D device may include scheduling information, such as the identification of communication resources allocated for D2D communication, and may also include timing and synchronization information.

D2D link information is transmitted by the first D2D device to a base station and provide to the controller. The D2D link information includes information about the D2D communication channel and communication that allows the controller to schedule the appropriate resources. The D2D link information may include data from one or both of the D2D devices in a D2D pair and may include measured data, calculated data, or estimated data regarding the communication channel or the D2D communication. D2D link information may include D2D channel characteristics, type of D2D communication, volume of D2D data, and other information. Although the first D2D device may receive D2D link data from the second D2D device and simply forward it to the base station, the first D2D device will process the first device D2D link data and the second device D2D link data to generate the D2D link information that will be transmitted to the base station.

In some situations, therefore, the controller manages the D2D communication link without the need to communicate directly with the second D2D device over a wireless link between the base station and the second device. In other situations, the first D2D device manages D2D communication in accordance with limitations provided by the controller as D2D control information transmitted from the base station. Therefore, only the first D2D device maintains direct wireless communication with the base station in some circumstances. In other circumstances, the second D2D device may maintain wireless communication with the base station for purposes other than D2D communication.

FIG. 1A is a block diagram of an example of a macrocell communication system 1 that supports device to device (D2D) communication where a first wireless communication device 10 sends D2D control signals 14, 16 to a second wireless communication device 20 for D2D link management. A controller 25 performs at least some centralized management and control of a D2D communication link 30 by sending D2D control information 65 over a wireless link between a base station 40 and the first wireless communication device 10 without exchanging D2D control information between the base station 40 and the second wireless communication device 20. Second device D2D link data 45 is received at the first wireless communication device 10 from the second wireless communication device 20 in a received D2D signal 50. In some circumstances, the second device D2D link data 45 can be directly forwarded to the base station by the first wireless communication device 10 in an uplink macrocell signal 55 to allow the controller 25 to evaluate the second device D2D link data 45 in order to schedule D2D communication resources. In other circumstances, the first wireless communication device 10 evaluates the second device D2D link data 45, as well as first device D2D link data 60, and generates D2D link information 35 which is sent to the base station 40 and controller 25 in an uplink macrocell signal 70. The D2D control information 65 is received at the first wireless communication device 10 from the base station 40 in a downlink macrocell signal 70. In a tightly network-controlled implementation, second device D2D control data 75 of the D2D control information 65 can be forwarded to the second device 20. In less tightly controlled implementations, the first wireless communication device 10 applies the D2D control information 65 to manage the D2D communication link 30. For example, where the D2D control information 65 includes D2D resource allocation information identifying time-frequency resources for use for the D2D communication link 30, the first wireless communication device 10 can determine which time-frequency resources will be used for transmitting signals from the first wireless communication device 10 and which will be used for transmitting D2D signals from the second wireless communication device 20. In addition, the first wireless communication device 10 can determine physical format parameters such as Multiple Input Multiple Output (MIMO) parameters, Modulation Order parameters, Coding Rate parameters, and Power Control parameters. The first wireless communication device 10, therefore, sends second device D2D control data 75 to the second wireless communication device 29 that is at least partially based on the D2D control information 65 received at the first wireless communication device 10 from the base station 40.

The use of wireless resources is reduced since only the link between the first wireless communication device and the base station needs to be maintained for D2D communication management. Therefore, the first wireless communication device maintains a macrocell communication while engaging in D2D communication. In some circumstances, the second wireless communication device may also communicate with the base station. For the example herein, however, no D2D control information is transmitted or received through a wireless link between the second wireless communication device and the base station.

In addition to D2D control data 75 that is directed to the second wireless communication device 20, the D2D control information 65 exchanged over the macrocell signal 70 with the first wireless communication device 10 typically includes first device D2D control data 60 directed to the first wireless communication device 10 as well as macrocell control signals for managing the macrocell link between the first device and the base station. Although the D2D control information for both devices can be sent in one signal, multiple transmissions can also be used. Also, macrocell control information for macrocell communication for the first wireless communication device may also be sent with the D2D control information in some circumstances. Therefore, the D2D control information 65 may include specific control information for each device, for only one device, or may include information that is processed by the first device to generate first device control data 60 for use by the first device 10 and generate second device control data for second device 20.

For the example, the second device D2D link data 45 includes buffer status reports (BSR). In some circumstances, the second device D2D link data 45 may also include D2D channel conditions measured by the second wireless communication device 20. For the examples herein, however, D2D channel conditions are determined and reported to the controller 25 by the first wireless communication device 10 in the D2D link information 35. Techniques of reporting channel conditions from one D2D device to take advantage of D2D channel symmetry are discussed in PCT Patent Application entitled "MANAGEMENT OF DEVICE-TO-DEVICE COMMUNICATION RESOURCES USING CHANNEL SYMMETRY", filed concurrently with this application, and incorporated by reference in its entirety herein Where the first wireless communication device measures the D2D channel characteristics, the second wireless communication device periodically transmits reference signals 80.

The D2D control information 65 includes one or more of D2D resource allocation information, paging messages, and synchronization information. The D2D resource allocation information includes an identification of communication resources allocated for D2D communication where the information at least identifies time-frequency resources that should be used for D2D transmission. A scheduler 85 that is communicatively connected to the base station 40 schedules (assigns) communication resources for transmitting D2D signals from the first wireless communication, device to the second wireless communication device and/or from the second wireless communication device to the first wireless communication device. The scheduler 85 uses reported channel information, and possibly other information such as BSR, to schedule the appropriate resources for D2D communication.

For one example, the D2D resource allocation information identifies all transmission parameters for D2D communication and, therefore, includes the physical format parameters such as Multiple Input Multiple Output (MIMO) parameters, Coding Rate parameters, Power Control parameters, and Modulation Order parameters in addition to the time-frequency parameters. In another example, however, the scheduler 80 only identifies the time-frequency parameters allowing one or both of the wireless communication devices to determine the MIMO, Coding Rate, Power Control and Modulation Order parameters. The channel information sent to the controller in such an example includes only channel information required for the scheduler to assign the time-frequency resources. The first wireless communication device applies other measured channel characteristics, extrapolated information, and/or other channel information to determine appropriate MIMO, Coding Rate, Power Control, and Modulation Order parameters. These parameters are provided to the second wireless communication device as part of the second device D2D control data 75. In one example for the implementation where the scheduler 85 only assigns time-frequency parameters, the first wireless communication device determines the MIMO, Coding Rate, Power Control and Modulation Order parameters that should be used for D2D transmission from the first wireless communication device and the MIMO, Coding Rate, Power Control and Modulation Order parameters that should be used for D2D transmission from the second wireless communication device.

The second device D2D control data 45 may also include timing and synchronization information. The second wireless communication device 20 may obtain synchronization and system timing information from reference signals 16 transmitted by the first wireless communication device 10 in situations where the second wireless communication device 20 is not maintaining communication with the base station 40. Accordingly, the timing and synchronization information that can be determined from the reference signal 16 is also second device D2D control data 45. This allows the second wireless communication device 20 to be synchronized to the system 1 when using macrocell communication resources assigned for D2D communication.

Reference signals transmitted from the wireless communication devices can be used for device detection/discovery, signal acquisition (reception), channel estimation, and determining channel characteristics. Although, other types of reference signals can be used, an example of a suitable technique for transmitting reference signals includes periodically transmitting D2D Sounding Reference Signals (SRS).

In one implementation, the second wireless communication device 20 periodically transmits D2D reference signals 80 such as D2D Sounding Reference Signals (SRS) over communication resources assigned by the controller. The first wireless communication device receives the reference signal 40 transmitted from the second wireless communication device 106 and measures at least one signal characteristic to determine the channel conditions to report to the base station 102. Examples of signal characteristics that can be measured include Least Square (LS) estimation, interference and noise power measurement, signal power measurement and SINR calculation. The channel information may include directly measured parameters or may include information that is based on the measured parameters depending on the particular implementation. For the example discussed herein, the channel information includes Channel State Information (CSI) of the channel between the second wireless communication device 20 and the first wireless communication device 10. The CSI is determined using techniques similar to convention techniques for determining CSI of a channel between a mobile device and a base station. The scheduler 85 that is communicatively connected to the base station schedules (assigns) communication resources for transmitting D2D signals from the first wireless communication device to the second wireless communication device. The scheduler 85 uses the reported channel information to schedule the appropriate resources. Therefore, measured signal characteristics of reference signals transmitted from the second wireless communication device to the first wireless communication device are used to schedule D2D transmissions from the first wireless communication device to the second wireless communication device.

As discussed above, the first wireless communication device 10 schedules some of the D2D communication resources in less tightly system-controlled configurations. Accordingly, the contents of the D2D link information 35 and the D2D control information 65 depends on the level of control exhibited by the system. Less information is required to be exchanged with the base station and the first wireless communication device where the first wireless communication device is scheduling resources. As a result, some decisions and functions of the system scheduler are performed by a scheduler process in the first wireless communication device in these situations according to guiding parameters provider by the controller. From the perspective of the second wireless communication device 20, the first wireless communication device 10 resembles a base station for purposes of D2D management.

For the examples herein, the communication system utilizes macrocell communication resources for communication between base stations (eNodeBs, eNBs) and wireless communication user equipment devices (UEs). The macrocell communication resources include downlink communication resources for downlink communication from a base station to wireless communication user equipment (UE) devices and uplink communication resources for uplink transmissions from the UE devices to the base station. The uplink communication resources are different from the downlink communication resources. Some of the macrocell communication resources are assigned to device-to-device (D2D) communication between two UE devices as needed. The downlink communication resources assigned for D2D communication are not used for downlink communication. For example, if the Communication resources are time-frequency communication resources, the time segments and frequency bands (e.g., sub-carriers) assigned to the D2D communication link are not used by the base station. If uplink communication resources are assigned for D2D communication, the resources are assigned such that interference to other D2D communication and to uplink communication in adjacent cells, as well as the same cell, is minimized. Examples of suitable techniques for managing macrocell resources for D2D communication are discussed in Patent Application Serial Number PCT/US2012/064711, entitled "DEVICE TO DEVICE COMMUNICATION MANAGEMENT USING MACROCELL COMMUNICATION RESOURCES," filed on Nov. 12, 2012, and incorporated by reference in its entirety herein.

Figure 1B:
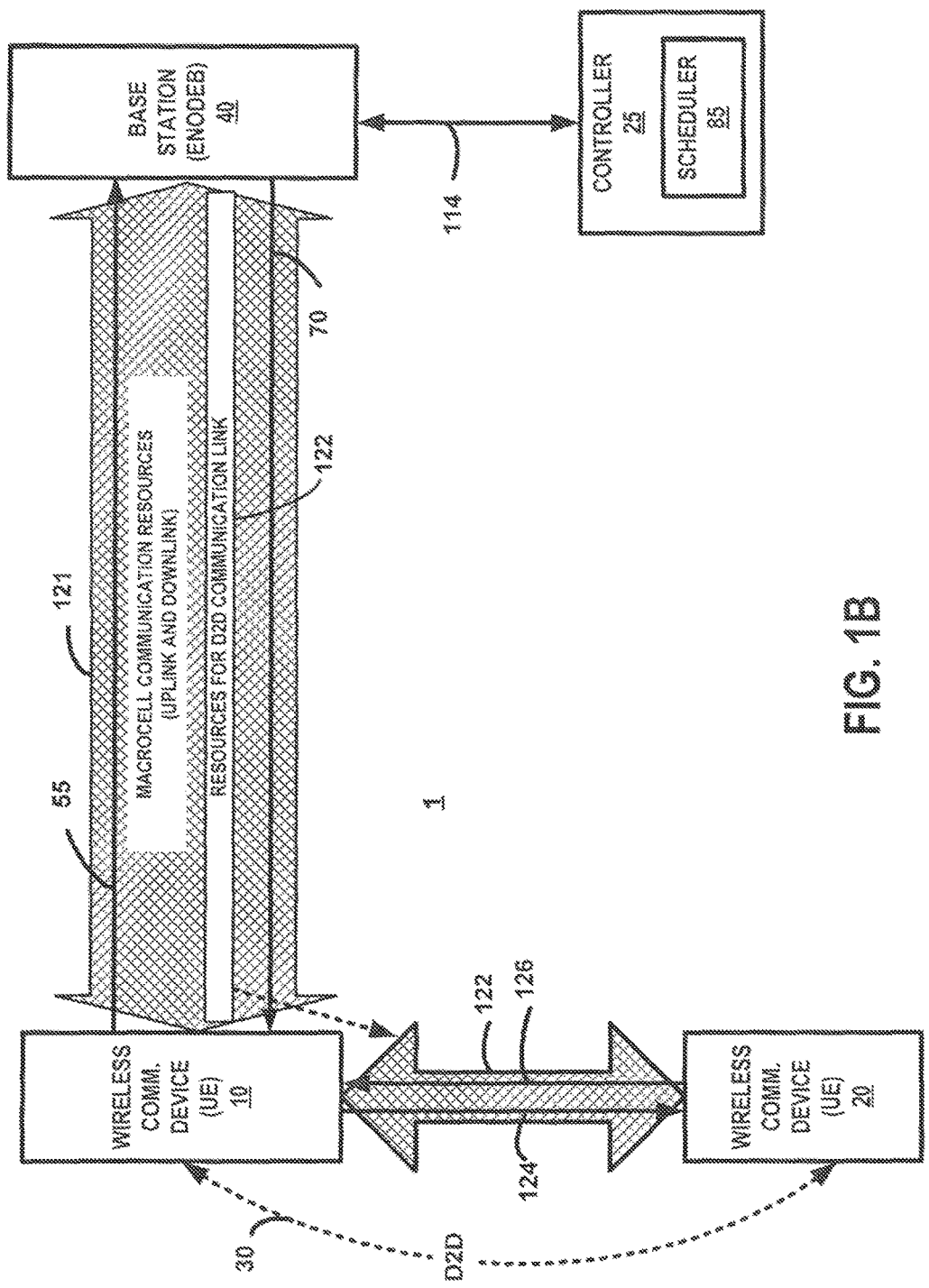
FIG. 1B is a block diagram of an example of a communication system where macrocell communication resources are used to establish a device-to-device (D2D) communication link between wireless communication devices.
Figure 1C:
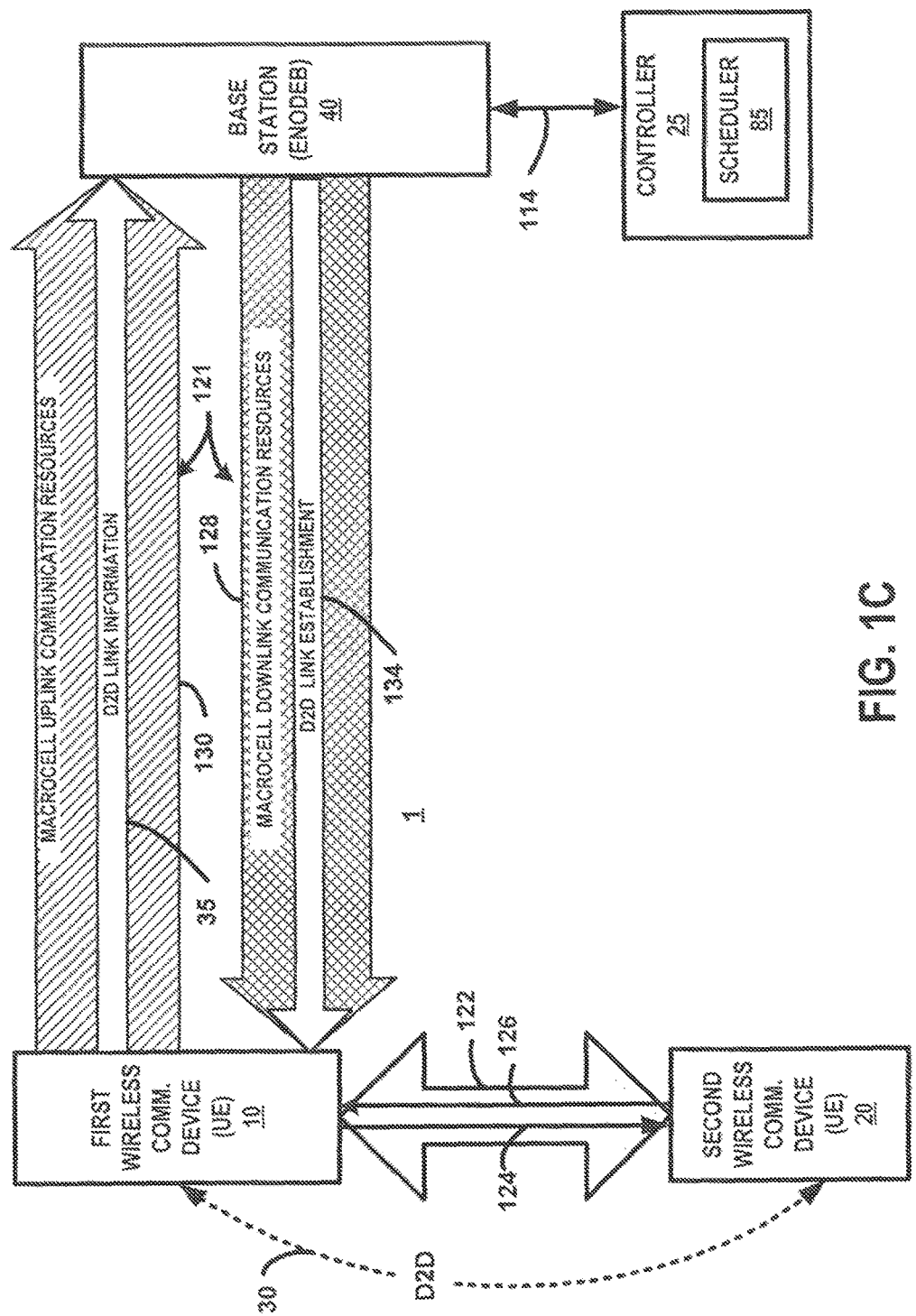
FIG. 1C is a block diagram of an example of the resources used in the communication system of FIG. 1A to establish the D2D communication link.

FIG. 1B and FIG. 1C are block diagrams of an example of the communication system 1 where macrocell communication resources are used for communication with wireless communication devices to establish the device-to-device (D2D) communication link 30 between wireless communication devices. A relationship between macrocell communication resources and the D2D communication link is shown in FIG. 1B. In FIG. 10, the resources for establishing the D2D communication link are shown. The base station 40 provides wireless communication services to wireless communication user equipment (UE) devices 10,20 within a geographical service area, sometimes referred to as a cell. For the example herein, the second device is not directly communicating with the base station. Such as situation may occur where the second wireless communication device does not have macrocell communication capabilities because of device design or because of signal obstruction. The situation may also occur where no need exists for the second wireless communication device to communicate with the base station at the particular time but could resume communication if needed. Several base stations are typically interconnected through a backhaul 114 to provide several service areas to cover large areas. The various functions and operations of the blocks described with reference to the communication system 1 may be implemented in any number of devices, circuits, or elements. Two or more of the functional blocks may be integrated in a single device, and the functions described as performed in any single device may be implemented over several devices. For example, at least some of the functions of the controller 25 may be performed by the base stations 40 and vice versa. A cellular communication system is typically required to adhere to a communication standard or specification. The Third-Generation Partnership Project Long-Term Evolution (3GPP LTE) communication specification is a specification for systems where base stations (eNodeBs) provide service to wireless communication devices (user equipment (UE) devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with a 3GPP LTE communication specification.

The base station 40 is a fixed transceiver station, sometimes referred to as an eNodeB or eNB, which may include a controller in some circumstances. The base station 40 is connected to a controller 25 through the backhaul 114 which may include any combination of wired, optical and/or wireless communication channels. For the examples herein, the controller 25 includes the functionality of the Mobility Management Entity (MME) and the Packet Gateway (P-GW) in a 3GPP LTE communication system. Accordingly, the controller 25 includes the scheduler 85. In the example, the scheduler 85 allocates time-frequency resources for D2D communication between the wireless communication devices 10, 20 and for macrocell communication between the base station 40 and the wireless communication device 10.

The wireless (UE) communication devices 10, 20 may be referred to as mobile devices, wireless devices, wireless communication devices, and mobile wireless devices, UEs, UE devices as well as by other terms. The wireless communication UE devices 10, 20 include electronics and code for communicating with base stations and with other wireless communication devices in D2D configurations. The wireless communication devices include devices such as cell phones, personal digital assistants (PDAs), wireless modem cards, wireless modems, televisions with wireless communication electronics, and laptop and desktop computers as well as other devices. The combination of wireless communication electronics with an electronic device, therefore, may form a wireless communication device 10. For example, a wireless communication device may include a wireless modem connected to an appliance, computer, or television.

The base station 40 includes a wireless transceiver that exchanges wireless signals 55, 70 with the wireless communication device 10. Transmissions from the base stations 40 and from the wireless communication device 10 are governed by a communication specification that defines signaling, protocols, and parameters of the transmission. The communication specification may provide strict rules for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical downlink control channels from a base station to a wireless communication device.

The macrocell communication resources 121 are used for transmitting the downlink signals 70 and the uplink signals 55. The base station 40 transmits downlink signals 70 to the wireless communication device 10 using scheduled downlink communication resources of the defined downlink communication resources defined by the communication specification and reserved for downlink communication. The wireless communication device 10 transmits uplink signals 55 to the base station 40 using scheduled uplink communication resources of the defined uplink communication resources defined by the communication specification and reserved for uplink communication. The macrocell communication resources 121 include frequency bands divided in time where each frequency band and segment of time can be identified by the scheduler 85 and described in control signals sent from the base station 40 to the wireless communication device 10. The communication specifications, or other system rules, therefore, define applicable communication resources for the downlink and applicable communication resources for the uplink. The scheduler 85 allocates different time-frequency resources to different devices to efficiently utilize the resources while minimizing interference. Accordingly, the scheduled macrocell communication resources used for signals 55, 70 exchanged with one wireless communication device 10 are different from scheduled macrocell communication resources used for other signals exchanged with other wireless communication devices. As referred to herein, therefore, the macrocell communication resources 121 are the communication resources reserved for communication by the specification and/or communication system rules. The scheduled resources for transmission for particular signals, however, are a subset of the reserved macrocell communication resources 121.

Some of the defined macrocell communication resources are assigned (scheduled) for D2D communication. This portion (122) of defined macrocell communication resources 121, referred to as D2D communication resources 122, is typically scheduled dynamically as needed and based on channel conditions as well as other criteria. The scheduler 85, therefore, may assign either defined macrocell downlink communication resources, defined macrocell uplink communication resources, or both for D2D communication.

In certain situations, it may be desirable for the wireless communication device to communicate directly over a D2D communication link instead of through base stations. During D2D communication, the first wireless communication device 10 transmits first D2D signals 124 (such as the signals 14, 16) to the second wireless communication device 20, and the second wireless communication device 20 transmits second D2D signals 126 (such as signals 50, 80) to the first wireless communication device 10. In some situations, the D2D transmission may only be in one direction. For example, a D2D link may be established from a laptop to a display where only the laptop transmits signals to the display for broadcasting, streaming and other purposes.

For efficient D2D communications, the wireless communication devices typically must be close to each other. Since many wireless communication devices are mobile, the distance between any two devices changes. As a result, either the network or one of the wireless communication devices must determine that the wireless communication devices are sufficiently close for D2D communication. In the examples herein, a wireless communication device detects another nearby wireless communication device by receiving a reference signal transmitted by the other wireless communication device. After defection, the wireless communication device may attempt to initiate a D2D communication link 30.

The scheduler 85 allocates time-frequency resources for communication between the base station 40 and the wireless communication device 10. In addition, the controller 25, scheduler 85, and/or the base station 40 schedule(s) sounding reference signals (SRS) on the uplink. In the examples discussed herein, the scheduler 85 also allocates (schedules) time-frequency resources for transmission of D2D reference signals, such as D2D SRS, from the wireless communication UE devices 10, 20 to establish and/or maintain the device-to-device (D2D) communication link 30. The D2D SRS transmissions are used for device detection/discovery, signal acquisition (reception), channel estimation, and determining CSI. Examples of such techniques are described in PCT patent application serial number PCT/US2012/64712, filed on Nov. 12, 2012, and incorporated by reference in its entirety herein. In the examples herein, therefore, wireless communication devices detect/discover other wireless communication devices in their vicinity by transmitting and receiving D2D SRS signals.

As discussed above, when one wireless communication device is aware of another wireless communication device and intends to communicate with the other wireless communication device, it may be more efficient to communicate through a D2D communication link instead of through the network. In order to avoid interference, the communication resources used for the D2D communication link 30 must be assigned or scheduled. Although it may be possible for the wireless communication devices to track and assign communication resources autonomously, a more centralized controller within the network can more easily manage the scheduling, reducing processing at the wireless communication devices. As described above, however, some of the D2D management may still be performed by the wireless communication device 10 where the controller 25 provides general control information.

Referring now to FIG. 1C, the communication system 1 utilizes downlink communication resources 128 for downlink communication from a base station to wireless communication user equipment (UE) devices and utilizes uplink communication resources 130 for uplink transmissions from the UE devices to the base station. The uplink communication resources are different from the downlink communication resources. Depending on the particular implementation, some of the downlink communication resources 128, some of the uplink communication resources 130, or some of both are assigned for device-to-device (D2D) transmission from wireless communication (UE) devices as needed. Accordingly, the D2D signals 124, 126 may use downlink communication resources 128 or uplink communication resources 130 assigned fey the scheduler 85. The communication resources 122 assigned for D2D communication are not used for downlink communication. For example, if the communication resources are time-frequency communication resources, the time segments and frequency bands assigned for D2D transmission are not used by the base station to serve non-D2D wireless communication (UE) devices. If uplink communication resources are assigned for D2D communication, the scheduling of those resources to other devices is managed to minimize interference.

The wireless communication (LTE) devices transmit the D2D signals 124, 126 using the assigned communication resources 122. As discussed herein, defined downlink communication resources are communication resources defined by a communication specification as the communication resources reserved for downlink communication from a base station to wireless communication devices. Scheduled downlink communication resources are a subset of the defined downlink communication resources that have been assigned (scheduled) for downlink communication between a base station and a wireless communication device, and D2D communication resources 122 are a subset of the defined downlink communication resources that have been assigned (scheduled) for D2D transmission from wireless communication devices if downlink communication resources are used for D2D communication.

Also as discussed herein, defined uplink communication resources are communication resources defined by a communication specification as the communication resources reserved for uplink communication from a wireless communication devices to base stations. Scheduled uplink communication resources are a subset of the defined uplink communication resources that have been assigned (scheduled) for uplink communication between a wireless communication device and a base station, and D2D communication resources 122 are a subset of the defined uplink communication resources that have been assigned (scheduled) for D2D transmission from wireless communication devices if uplink resources are used for D2D communication. Therefore, the defined macrocell communication resources 121 include defined macrocell downlink communication resources 128 and defined macrocell uplink communication resources 130 where a subset of one or both of the defined resources are assigned for D2D communication.

For the examples herein, the communication network manages D2D communication links by receiving and transmitting information over macrocell communication resources with only one of the D2D devices. The wireless communication device 10 transmits D2D link information 35 to the base station using macrocell uplink communication resources and the base station transmits D2D link establishment messages 134 to the wireless communication devices using macrocell downlink communication resources. The D2D link establishment messages 134 are, therefore, an example of D2D control information 65. Examples of techniques, for establishing D2D calls are discussed in PCT Patent Application No. PCT/US2013/040584, entitled "MANAGEMENT OF DEVICE-TO-DEVICE COMMUNICATION RESOURCES USING MACROCELL COMMUNICATION RESOURCES", filed on May 10, 2013 and incorporated by reference in its entirety herein. As discussed in the referenced PCT Application No PCT/US2013/040584, the a D2D call/session can be initiated by a wireless communication device by sending a D2D call initiation message using macrocell uplink communication resources. The D2D call initiation message can further include a D2D call type indicator indicating whether the establishment of the D2D communication link is for a Voice over internet Protocol (VoIP) call or for a transfer of data. If the D2D call type indicator indicates the transfer of data, the D2D call initiation message further includes a D2D Buffer Status Report (BSR) indicating a volume of data to be transmitted over the D2D communication link.

The first wireless communication device, in response to the base station, transmits D2D link information 35 to the base station. The D2D link information 35 may include any parameter or indicator that provides the base station information regarding the communication link between the first wireless communication device and the second wireless communication device. The D2D link information 35 at least includes channel information and may include parameters describing the channel qualify, amount of data to be transmitted over the D2D link, transmission power and other information. For the examples herein, the D2D link information 35 may include a D2D Buffer Status Report (BSR) indicating a volume of data to be transmitted over the D2D communication link, a D2D Power Headroom Report (PHR) indicating available transmission power for D2D transmission over the D2D communication link, and D2D Channel State Information (CSI) comprising at least one characteristic of a channel of the D2D communication link. For this example, therefore, the D2D link information 35 is an example of uplink D2D control information 108. The D2D link information 35 may include the second device D2D link data 50 obtained from the second wireless communication device 20 and/or information generated by the first wireless communication device. For example, the CSI of the channel may be determined by the first wireless communication device 10 and a BSR may be provided by the second wireless communication device in the second device D2D control data transmitted in D2D signal 50.

The base station sends D2D link establishment information 134 to the first wireless communication device 10 where some of the information may be directed to the second wireless communication device. The D2D link establishment information includes information that allows the wireless communication devices to communicate over the D2D communication link and includes scheduling information for time-frequency communication resources to be used for the D2D communication link. The D2D link establishment information may include specific information for a single one-way D2D transmission or may include more general channel information such as identification of authorized D2D resources that allow the wireless communication devices to schedule multiple D2D transmissions without specific instruction by the network for each transmission. The D2D link establishment information is transmitted to the wireless communication device using macrocell downlink communication resources. As discussed in the referenced PCT application No. PCT/US2013/040584, an example of a suitable technique for transmitting the D2D link establishment information 134 includes sending the information over a physical downlink control channel (PDCCH). Such a PDCCH is similar to a conventional PDCCH transmission assigning communication resources for macrocell communication except that the identified communication resources are assigned for D2D communication instead of conventional macrocell communication.

For the examples, therefore, the scheduler 85 in the controller 25 allocates D2D time-frequency resources 122 to the wireless communication devices 10, 20 by providing the D2D link establishment information 134 (D2D control information 70) to the first wireless communication device 10. The information 134 is transmitted by the base station using the PDCCH although the information may be transmitted using any number of control signals, and/or messages. The D2D link establishment information 134 may be processed by the first wireless communication device 10 to generate the second device control data 75.

Figure 2:
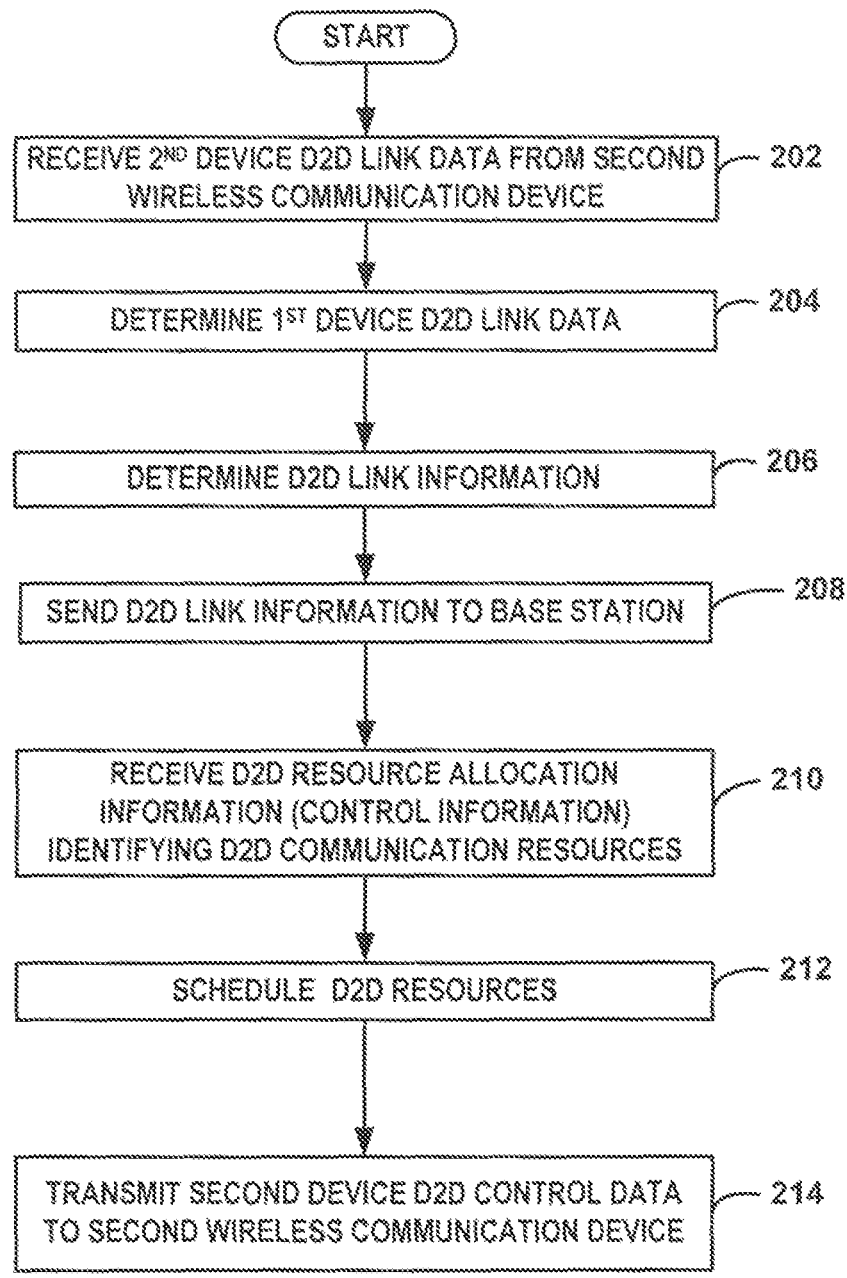
FIG. 2 is a flowchart of an example of a method of managing D2D communication at a wireless communication device.

FIG. 2 is a flowchart of an example of a method of managing D2D communication performed at a wireless communication device (UE) such as the first wireless communication device 10.

At step 202, the wireless communication device 10 receives second device D2D link data 45 from another wireless communication device 20. The second device D2D link data 45 may include any types of conventional control signals used for communication with a base station in conventional system. Paging messages, CSI, acknowledgment (ACK) messages, non-acknowledgment (HACK) messages are examples of D2D link data. Some of the second device D2D link data 45 may be data for transmission to the base station while other data may be for processing by the first wireless communication device. For example, if the second device D2D link data includes a Buffer Status Report, this information may be forwarded to the base station. The Buffer Status Report indicates the volume of data to be transmitted.

Step 202 cannot typically occur immediately after device detection in situations where the second wireless communication device 20 does not have system timing. For example, some information control data must be provided to the second wireless communication device before it can transmits over the D2D link. In some implementations, the first wireless communication device always initiates the D2D session. In such situation, the first device detects the second device by listening to the reference signals transmitted by the second device. Then the first device provides the relevant control information (timing, sync, and resources on which the second device can transmit its information. Accordingly, step 202 will occur after such information is provided.

At step 204, the wireless communication device 10 determines first device D2D link data. In the example, the first wireless communication device channel characteristics of the D2D link 30 by measuring and evaluating a reference signal 80 transmitted by the second wireless communication device. Therefore, the first device link data 60 may include channel condition information, such as D2D Channel State Information (CSI) comprising at least one characteristic of a channel of the D2D communication link, in some situations. Other information, such as D2D Buffer Status Report (BSR) indicating a volume of data to be transmitted over the D2D communication link by the first device 10, and a D2D Power Headroom Report (PHR) indicating available transmission power for D2D transmission over the D2D communication link may also be part of the first device D2D link information.

At step 206, the wireless communication device 10 determines the D2D link information. In the example, the first device 10 evaluates the first device D2D link data 60 and the second device D2D link data 45 to generate the D2D link information 55. The D2D channel information may be information that is calculated based on measured channel characteristic or may be the channel characteristics. An example of D2D channel information is CSI, For the example, the D2D channel information is transmitted as part of D2D link information. In addition to CSI, the D2D link information may include a D2D Buffer Status Report (BSR) indicating a volume of data to be transmitted over the D2D communication link and a D2D Power Headroom Report (PHR) indicating available transmission power for D2D transmission over the D2D communication link. In some situations where a D2D voice call is being initiated, the BSR may be omitted. The D2D link information in these situations may also include an indicator indicating that the D2D call is a voice call. Therefore, the channel characteristics for the D2D link information is typically maintained by the wireless communication device by evaluating the periodically transmitted reference signals by the second wireless communication device. The D2D link information is transmitted to the base station using macrocell uplink communication resources. For the examples, the D2D link information is transmitted with the macrocell CSI information for the macrocell communication link between the base station and the first wireless communication device 104. Transmission of the D2D link information is similar to transmission of BSR, CSI, and PHR in conventional macrocell communication. The transmission of the D2D link information, however, also includes an indication that the information is related to a D2D communication link. Accordingly, the D2D link information may be transmitted on a PUSCH or PUCCH along with macrocell link information. For the examples herein, the wireless communication device maintains a macrocell connection while engaging in D2D communication and provides channel characteristics of the macrocell channel as well D2D link information.

At step 208, the wireless communication device 10 sends the D2D link information to the base station (eNB) 40.

At step 210, the wireless communication device 10 receives D2D control information from the base station (eNB) 40. The D2D control information includes D2D resource allocation information identifying D2D communication resources. As discussed above, the D2D communication resources are a subset of the defined communication resources defined by the communication specification for the system 1. The D2D control information is transmitted over the Physical Downlink Control Channel (PDCCH) in the examples. Accordingly, the link establishment information is received by the wireless communication device 10 using macrocell downlink communication resources. In the examples, the D2D link establishment information identifies the subset of defined macrocell communication resources that are to be used for transmission of D2D signals from either the first wireless communication device to the second wireless communication device and/or from the second wireless communication device to the first wireless communication device. The D2D control information includes Transport Format Selection and Power Control commands for D2D transmission in some cases.

For the example of FIG. 2, the D2D control information identifies time-frequency resources hut does not specify physical parameters such as Multiple Input Multiple Output (MIMO) parameters, Modulation Order parameters, Coding Rate parameters, and Power Control parameters. In some situations, some or all of these physical parameters can be provided by the network.

At step 212, D2D communication resources are scheduled by the first wireless communication device. In a more tightly system-controlled implementation, the scheduling and processing includes allocating resources and sending control signals to the second wireless communication device in accordance with the specific instructions included in the D2D control information. In less tightly system-controlled implementations, the first wireless communication device evaluates the first device D2D link data 60, the second device D2D link data 45, and the D2D control information 65 to allocate resources for D2D communication. In one example, the D2D control information includes the time-frequency resources without specifying physical parameters.

As a result, the first wireless communication device evaluates the first device D2D link data 60 and the second device D2D link data 45 to determine physical parameters such as MIMO parameters, Modulation Order parameters, Coding Rate parameters, and Power Control parameters.

At step 214, the second device D2D control data 75 is transmitted to the second wireless communication device 20. The data 75 includes D2D communication resources such as time-frequency resources as well as physical parameters such as MIMO parameters, Modulation Order parameters, Coding Rate parameters, and Power Control parameters. As described above, in some circumstances, the second device D2D control data 75 includes system timing and synchronization information. A reference signal 16 that is transmitted in accordance with system timing provides timing information to the second wireless communication device. For the example, the first wireless communication device 10 periodically transmits reference signals. An example of a suitable technique is discussed in the above-referenced patent PCT application serial number PCT/US2012/64712. Accordingly, the second wireless communication device receives a reference signal, such as a SRS, from the first wireless communication device for synchronization. As a result, the second wireless communication device 20 does not need to maintain a communication link with the base station to be synchronized to the system.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method performed at a first device-to-device (D2D) wireless communication device, the method comprising:
    deriving system timing of a macrocell communication system from a macrocell reference signal received from a base station;
    transmitting a reference signal to a second D2D wireless communication device over a D2D communication link using D2D communication resources that are a subset of defined macrocell communication resources defined by a communication specification for the macrocell system, the reference signal providing the system timing to the second D2D wireless communication device.

2. The method of claim 1, comprising:
    receiving a D2D signal from the second D2D wireless communication device, the D2D signal synchronized to the system timing.

* * * * *